United States Patent [19]
Barron

[11] 4,101,179
[45] Jul. 18, 1978

[54] DRILLING STABILIZER INCLUDING MECHANICAL INTERLOCK DEVICE

[75] Inventor: Alvie Barron, Dallas, Tex.

[73] Assignee: Royal Tool Company, Inc., Dallas, Tex.

[21] Appl. No.: 838,686

[22] Filed: Oct. 3, 1977

[51] Int. Cl.² .............................................. F16C 1/26
[52] U.S. Cl. ................................... 308/4 A; 175/325
[58] Field of Search ............. 308/4 A, 4 R, 8.2, 237; 166/301, 241, 315; 175/325

[56] References Cited

U.S. PATENT DOCUMENTS

| | | | |
|---|---|---|---|
| 3,642,079 | 2/1972 | Van Note | 308/4 A X |
| 3,916,998 | 11/1975 | Bass, Jr. et al. | 175/325 X |

*Primary Examiner*—Trygve M. Blix
*Assistant Examiner*—Douglas C. Butler
*Attorney, Agent, or Firm*—Fulbright & Jaworski

[57] ABSTRACT

A rigid stabilizer sleeve having outwardly extending ribs is slideably received over a drill collar. A pair of internal clamping rings are slideably received through each end of the rigid main sleeve. As a threaded end cap is threaded into the rigid main sleeve, the end clamp forces one ring of the pair against the other thereby producing a clamping effect whereby the stabilizer can be clamped at any desired position on the drill collar. An outer ring of the pair of rings has a groove and a rib disposed on its interior cylindrical surface; the portion of the end clamp received by the outer ring has a rib and a groove disposed upon its outer cylindrical surface. As the end cap receives the outer ring, the rib and the groove of the end cap interlock with the groove and the rib respectively of the outer ring whereby when the end cap is threadedly removed from the rigid main sleeve, the outer ring follows the end cap and is disengaged from the inner ring, thereby unclamping the pair of rings from the drill collar.

5 Claims, 3 Drawing Figures

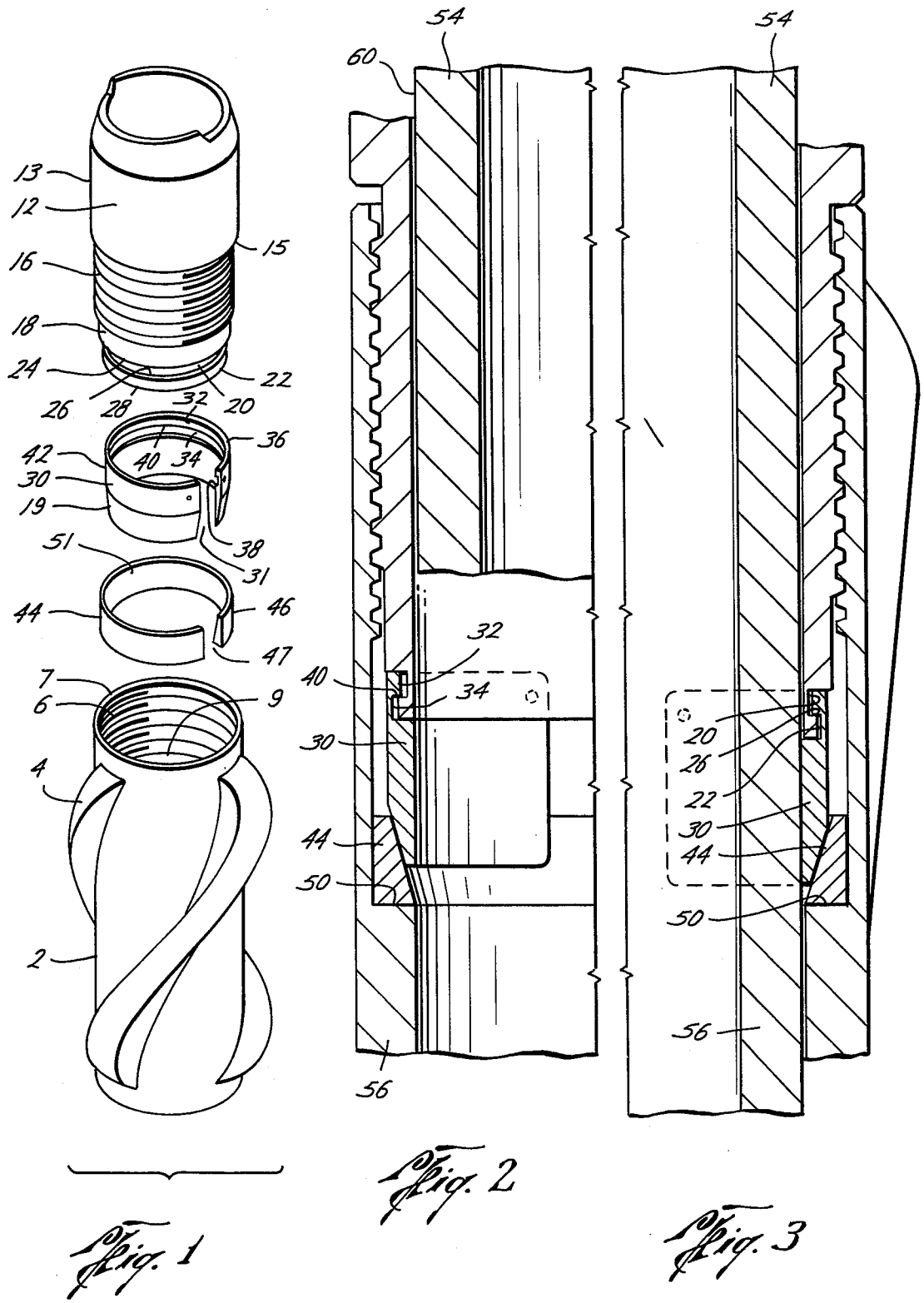

DRILLING STABILIZER INCLUDING MECHANICAL INTERLOCK DEVICE

BACKGROUND OF THE INVENTION

Oil field drilling operations utilizing a rotary drill string and having a section or sections of drill collar immediately above the drill bit require the application of a drilling stabilizer to the drill collar section or sections in order to minimize the seizure within the drill bore of the drill collar as well as to stabilize the drill string during drilling operations.

It is desired that a drilling stabilizer be quickly connected or disconnected to the drill collar, and that a minimum of manual operations be involved during the connecting or disconnecting of the stabilizer. It is further desirable to employ a drilling stabilizer which can be affixed to the collar section in such a manner that each stabilizer can be affixed at any desired interval from the preceeding stabilizer. Those familiar with oil field operations will recognize that the various combinations and spacings of drilling stabilizers are often determinative in obtaining a desired drilling result. It is also advantageous to utilize a drilling stabilizer which is durable throughout a particular drilling operation and which is readily adaptable to any number of dissimilar drill collars utilized in oil field operations around the world. One such drilling stabilizer which has frequently been used is described and claimed in U.S. Pat. No. 3,916,998 (hereinafter referred to as the 3,916,998 patent).

The drilling stabilizer described in the 3,916,998 patent comprises fundamentally a rigid main sleeve having an axial passageway extending therethrough and a rib midway of the passageway against each side which a pair of slideably received rings abut. An end cap is threadedly engaged into each end of the rigid main sleeve in such a manner that as the end cap is threaded into the sleeve the inner ring of a pair of rings is forcefully urged into a clamping engagement with the outer surface of the drill collar. Likewise, the outer ring is forced against the inner surface of the main sleeve. Consequently, the device in the 3,916,998 patent can be selectively applied to any location on a drilling collar. Moreover, since only the interior surface of the inner split ring contacts the drill collar, flexibility within the drill collar is not sacrificed by the application of numerous drilling stabilizers.

A shortcoming of the device in the 3,916,998 patent, however, has been that once the drilling stabilizer is successfully clamped onto the drill collar, it is frequently difficult to disengage and remove the stabilizer from the collar. Those familiar with drilling operations appreciate that mere removal of the end cap from the rigid main sleeve often does not disengage the outer split ring from the inner split ring on either or both pairs of rings. Consequently, although the end cap has been threadedly disengaged from the rigid main sleeve, the corresponding pair of split rings still exerts a force or forces clamping the stabilizer to the collar. A common practice for disengaging the stabilizer from the collar has been to strike the stabilizer forcefully with any suitable device such as a large hammer. Such an operation clearly requires additional manual effort, tools, time and is also destructive of the stabilizer itself.

The present invention is directed toward the elimination of the shortcomings of a drilling stabilizer similar to the one shown and described in the 3,916,998 patent.

The present invention described and claimed hereinafter employs an annular rib and an annular groove on the interior surface of the outer split ring and an annular groove and annular rib on the exterior surface of the end cap whereby the rib of the outer ring is substantially disposed within the groove of the end cap and the rib of the end cap is substantially disposed within the groove of the outer ring. The outer ring is urged into engagement with the end clamp before threading the end cap into the main sleeve. The interaction between the groove and rib on the ring with the rib and groove respectively of the end cap produces a locking action in the axial direction. The result of the axial interlock configuration is that the outer split ring necessarily follows the end cap as the end cap is threadedly disengaged from the rigid main sleeve, thereby unclamping the pair of rings from the sleeve and drill collar. Those familiar with drilling operations will realize that as the second end cap is threadedly disengaged from the drilling stabilizer that the stabilizer itself can be axially moved along the drill collar for repositioning, engagement and disengagement with the collar.

It is an object of the present invention to provide a drilling stabilizer which is easily applied to and removed from a drill collar.

Another object of the present invention is to utilize a clamping means of the drill stabilizer which allows the stabilizer to remain clampingly fixed to the drill collar without unduly restricting the flexibility of the collar.

A still further object of the present invention is to provide a clamping means in the drilling stabilizer which, when actuated by the end cap effectively affixes the stabilizer to the drill collar, and upon disengagement of the end cap from the rigid main sleeve unclamps the clamping means thereby allowing the drilling stabilizer to be axially repositioned on or removed from the drill collar.

It is yet a further object of this invention to provide a clamping means on a drilling stabilizer which is effectively and automatically unclamped without applying shock forces to the drilling stabilizer or without the use of auxiliary tools other than those necessary to threadedly remove the end cap from the rigid main sleeve.

Further objects and other features and advantages of the present invention will be apparent in the following description of the preferred embodiments of the invention, given for the purpose of disclosure and taken in conjunction with the accompanying drawings.

BRIEF DESCRIPTION OF THE DRAWINGS

FIG. 1 is an exploded vertical view of the upper portion of the drilling stabilizer showing the rigid main sleeve, an inner split locking ring, an outer split locking ring and one end cap with a clutch jaw.

FIG. 2 is a sectional view of part of the rigid main sleeve, the slideably received drill collar, the inner and outer split locking rings and a portion of the end cap prior to activating the clamping action of the inner and outer rings.

FIG. 3 is a sectional view of a portion of the rigid main sleeve, the drill collar, the inner and outer split rings, and a portion of the end cap after the actuation of the clamping effect.

DESCRIPTION OF THE PREFERRED EMBODIMENTS

FIG. 1 shows the upper portion of the drilling stabilizer as it is commonly situated in a well bore. A main sleeve 2 having one or more outwardly projecting spiral flanges 4 has a substantially cylindrical internal passageway 9 extending axially the length of the main sleeve 2 and is suitable for receiving a drill collar 54 or other similar body. An inwardly projecting abutment means, for example an annular rib 56 (FIGS. 2, 3), having an upper shoulder 50 and a lower shoulder not shown herein is disposed medially in the interior of the main sleeve 2. An inner split locking ring 44 having an open slot 47, an exterior cylindrical surface 46 and an interior conical surface 51 is slideably received into the passageway 9 of the main sleeve 2. The inner locking ring 44 is of a smaller diameter than the inner annular rib 56 of the main sleeve 2; therefore, the inner ring 44 is slideably received in passageway 9 of main sleeve 2 and abuts the shoulder 50 of the rib 56.

The outer locking ring 30 has an open slot 31, a cylindrical exterior surface 42, a conical exterior surface 19 and a substantially cylindrical interior surface 43. The inner ring 44 substantially overlies the conical surface 19 of the split ring 30 as shown in FIG. 2. On the upper portion of the interior cylindrical surface 43 of the outer locking ring 30 is disposed an inwardly projecting annular rib 32. An annular groove 34 is disposed immediately below the rib 32 as shown in FIG. 1, the groove 34 communicating with the interior cylindrical surface 43 of the outer ring 30. In the particular embodiment shown, the groove 34 and the rib 32 have a common radially-aligned wall 40. The outer split ring 30 is urged by means of any suitable leverage device (not shown) onto the end cap 12 and into locking engagement with said end cap before the end cap is threadedly engaged to the main sleeve 2.

An end cap 12 having a sleeve 13 of a greater diameter than the projecting member 18 is slideably received by the passageway 9 of the main sleeve 2. The threads 16 of the end cap 12 are compatible with the threads 6 of the main sleeve 2 thereby permitting threaded engagement of the end cap 12 with the main sleeve 2 until the leading shoulder 15 of the sleeve 13 abuts the leading surface 7 of the main sleeve. As depicted in FIG. 1, an outwardly projecting rib 22 is disposed on the projecting member 18 such that the lead wall 28 of the rib 22 is first received by the main sleeve 2. Contiguous to and having a common wall 26 with the rib 22 is an annular groove 20 communicating with the exterior of the projecting member 18 and having a trailing wall 24. When the end cap 12 is threadedly engaged into the main sleeve 2, the inner ring 44 abutting the shoulder 50 and the outer ring 30 are axially forced together whereby the inner ring 44 is urged radially outwardly to clampingly engage the interior surface of the main sleeve 2 while the outer ring 30 is urged radially inwardly by the internal ring 44 into clamping engagement with the exterior surface 60 of the drill collar 54. Further engagement of the threads 16 with the compatible threads 6 allows axial forces to be transmitted by the lead wall 28 and the trailing wall 24 of the end cap 12 to the trailing wall 38 and the leading wall 36 respectively of the outer ring, thereby urging the outer ring 30 axially toward the inner ring 44 thereby increasing the clamping force between the inner ring 44 and the main sleeve 2 and the outer ring 30 and the drill collar 54 as shown in FIG. 3.

As the end cap 12 is threadedly disengaged from the main sleeve 2, the common wall 26 of the end cap is urged against the common wall 40 of the outer ring 30 whereby the outer ring 30 is successfully and forceably disengaged from the inner ring 44. The disengagement of the outer ring 30 from the inner ring 44, therefore, reduces the radial forces of the inner ring 44 upon the main sleeve 2 and the radial forces of the outer ring 30 upon the drill collar 54 thereby releasing the upper portion of the main sleeve 2 from clamping engagement with the drill collar 54.

It is understood that a pair of rings and an end cap similar to the rings 30, 44 and the end cap 12 as shown in FIG. 1 are also received by the lower end of the main sleeve 2, thereby clamping the bottom portion of the main sleeve 2 onto the drill collar 54. It is further understood that the drilling stabilizer can be operated in the oil field by clampingly engaging only one end of the main sleeve 2 to the drill collar 54. For purposes of increased stability as well as to disclose a preferred embodiment, however, the best mode of the present invention utilizes a pair of split rings and an end cap received through the passageway 9 at each end of the main sleeve 2.

In oil field operations, therefore, the invention as described and claimed herein is quickly and easily engaged to or disengaged from the drill collar. A typical procedure for disengagement requires the slips (not shown) to be set below the stabilizer. The upper end cap 12 is "broken out" or threadedly disengaged from the main sleeve 2 with, for example, a tong (not shown). The drill collar 54 is then raised through the slips and set at a level appropriate for the lower end cap (not shown) to be broken out from the main sleeve 2. Before the lower end cap is broken out from the main sleeve 2, it is necessary to support the drilling stabilizer, for example, by an air hoist line or cat line (not shown). The final step is to break out the lower end cap from the main sleeve 2. As the lower end cap is threadedly disengaged from the main sleeve 2, the clamping forces affixing the stabilizer to the drill collar 54 have been reduced, and the stabilizer is now free to slide on the collar. For reasons of safety, the air hoist line or cat line should be attached to the stabilizer prior to breaking out the lower end cap for support of the stabilizer as it becomes free to slide on the collar.

The preferred embodiments of the present invention have been given for the purpose of disclosure, and changes may be made which are within the spirit and the scope of the invention as defined by the claims, specifications and drawings herein.

What is claimed is:

1. An improved drilling stabilizer having a substantially cylindrical rigid main sleeve, an axial passageway extending the entire length of the rigid main sleeve and including an inwardly extending fixed abutment means medially of the passageway, the innermost extent of which abutment means defines an opening of sufficient size to permit the sleeve to be slideably received over a drill collar, a flange extending radially outwardly of the rigid main sleeve, a clamping means positioned internally of the rigid main sleeve adjacent the fixed abutment means including first and second pairs of overlying inner and outer split rings each having a single opening, each pair of split rings positioned on opposite sides of the abutment means, one ring of each pair of split rings engaging the abutment means, each pair of rings of sufficient diameter to be slideably received over the drill collar and having abutting conical surfaces oriented so that the axial movement of one split ring of each pair relative to the other split ring of the same pair results in a clamping or unclamping of the inner ring to the rigid main sleeve and the outer ring to the drill collar, and an end cap slideably and threadedly received by the rigid main sleeve to activate the clamping means, wherein the improvement comprises:

a mechanical interlock means for engagement of the outer split ring of one pair of rings to the end cap whereby the outer ring is disengaged axially from the inner ring of the pair as the end cap is threadedly removed from the main sleeve, thereby unclamping the pair of rings from the rigid main sleeve and the drill collar.

2. The apparatus of claim 1 wherein the interlock means for engagement of the outer ring to the end cap comprises:

(a) a radially projecting rib circumferentially disposed on the end cap in proximity to the end of the cap which engages the outer split ring;

(b) an annular groove in the end cap, which trails the rib of the end cap into the outer ring when said outer split ring is engaged by the end cap;

(c) a circumferential rib projecting radially inwardly from the outer ring such that when the end cap engages the outer split ring, the rib of the outer ring is substantially disposed within the annular groove on the end cap;

(d) an annular groove in communication with an interior cylindrical surface of the outer split ring, whereby the rib of the end cap is substantially disposed within the annular groove of the outer split ring when the end cap engages the outer split ring; and (e) means for biasing the groove and rib of the outer split ring toward the rib and groove respectively of the end cap as the end cap engages the outer split ring.

3. The apparatus in claim 2 wherein the groove and the rib on the end cap share a common wall and the groove and the rib on the outer split ring share a common end wall.

4. The apparatus of claim 3 wherein the means (e) is the resiliency of the outer split ring resulting from the split in said outer split ring.

5. The apparatus of claim 4 wherein as the end cap is threadedly engaged by the rigid main sleeve, the outer split ring is urged into clamping engagement with the drill collar, the inner ring is urged into clamping engagement with the outer split ring and the rigid main sleeve and as the end cap is threadedly disengaged from the main sleeve, the outer split ring is axially disengaged from the inner split ring thereby unclamping the inner split ring from the main sleeve and the outer split ring from the drill collar.

* * * * *